May 11, 1965
S. H. A. SCHMAUS
3,182,506
MILK COOLER TEMPERATURE CONTROL
Filed Jan. 8, 1962
2 Sheets-Sheet 2
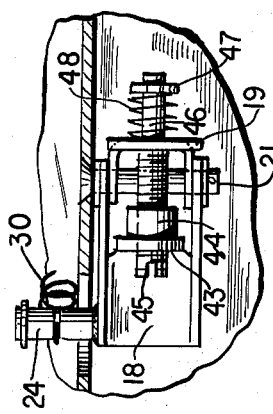
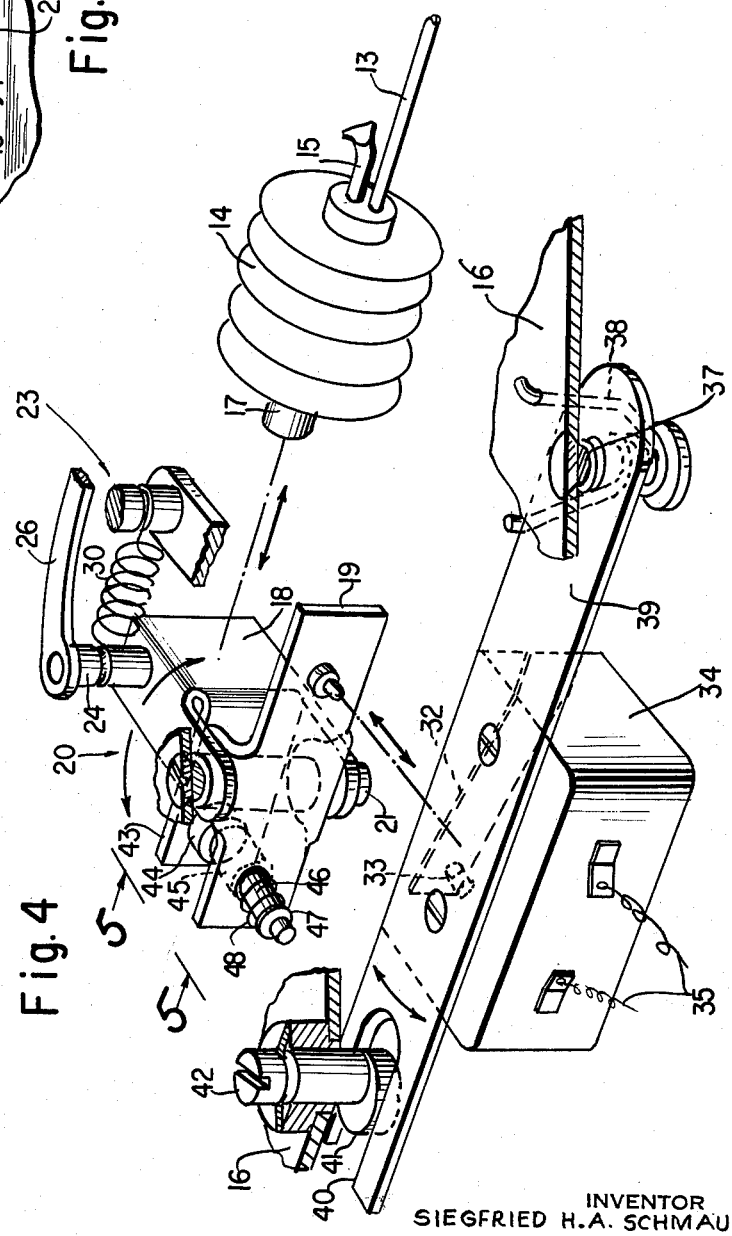
INVENTOR
SIEGFRIED H.A. SCHMAUS
BY
Robertson and Smythe
ATTORNEYS

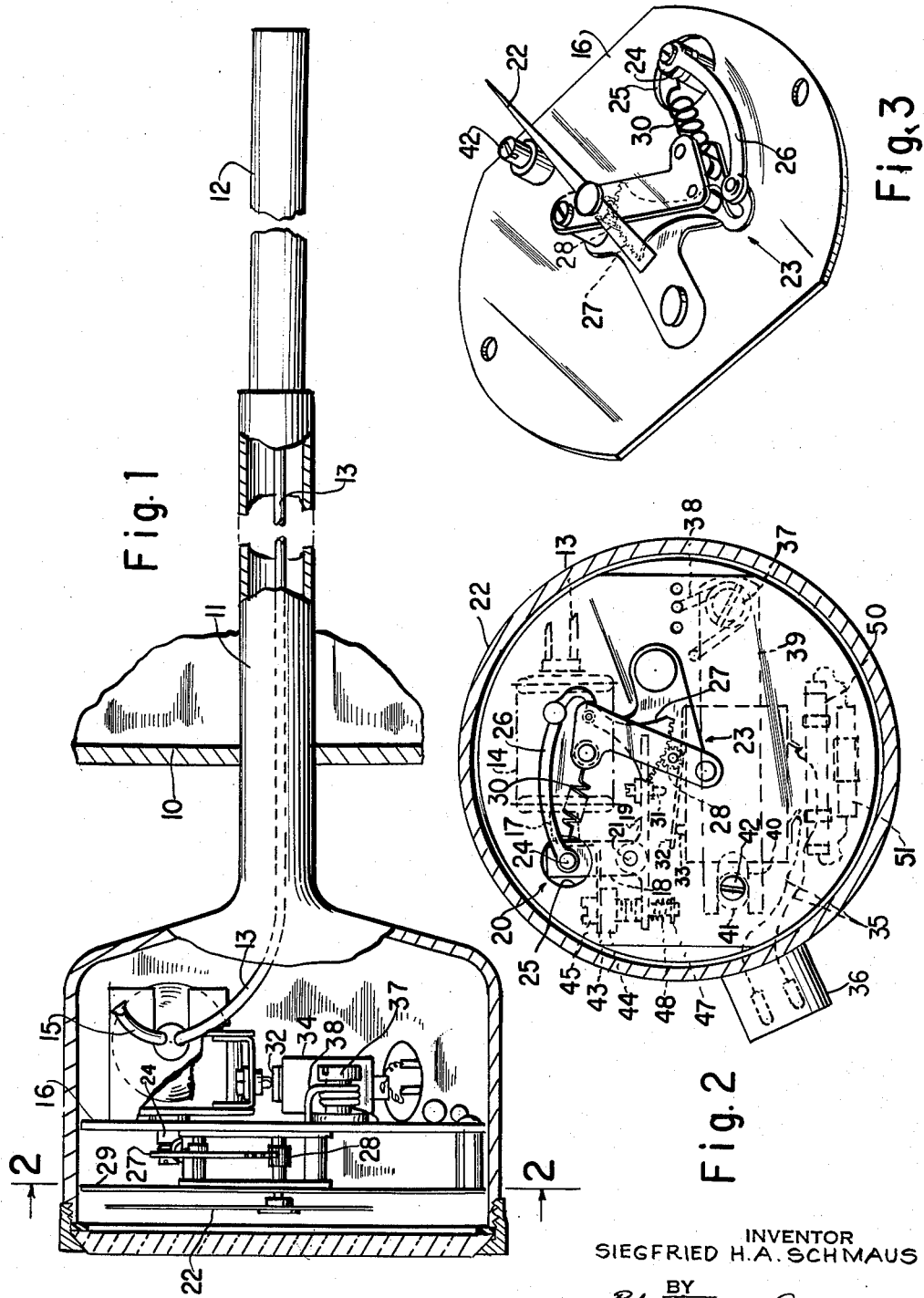

United States Patent Office 3,182,506
Patented May 11, 1965

3,182,506
MILK COOLER TEMPERATURE CONTROL
Siegfried H. A. Schmaus, Philadelphia, Pa., assignor to Ametek, Inc., New York, N.Y., a corporation of Delaware
Filed Jan. 8, 1962, Ser. No. 164,801
6 Claims. (Cl. 73—343)

This invention relates to condition measuring and controlling systems and more particularly to an improved linkage arrangement for use in such systems.

In measuring and control instruments a sensing means, such as a fluid means responsive to changes in the condition being measured and controlled, is used to actuate a linkage or motion transmitting means. The sensing means is connected to a indicator for depicting the measured condition. Heretofore, a significant problem has arisen in that the linkage of such combination instruments may be complicated.

One of the objects of this invention is to provide a linkage arrangement for a combination condition measuring and control system wherein the linkage arrangement operates with a minimum of mechanical parts and in which lost motion thereof is minimized.

It is a further object of this invention to provide a combination condition measuring and control instrument, which is compact, is simple and yet is accurate.

It is still a further object of this invention to provide means for adjusting the time period in which the linkage actuates the control element.

In one aspect of the invention, a condition responsive means is provided which actuates a motion transmitting means including a bell crank wherein the line of action of the condition responsive means intersects the bell crank. The motion transmitting means is connected to an indicating means and also actuates a switch means for controlling the restoration of the desired condition.

In another aspect of the invention, the motion transmitting means includes two arms positioned on a common pivotal support in a predetermined relation to each other.

In a further aspect of the invention, there is provided means for positioning the motion transmitting arms with respect to each other.

In a still further aspect of the invention, the switch means is pivotally mounted and means are provided for adjustably positioning the switch means about its pivotal axis.

These and other objects, advantages and features of the invention will become apparent from the following description and drawings which are merely exemplary.

In the drawings:

FIG. 1 illustrates a vertical section of a combination condition measuring and control instrument constructed in accordance with the invention;

FIG. 2 is a sectional view taken along the lines 2—2 of FIG. 1 in the direction of the arrows, and further illustrates in dotted lines, the control element and means for actuating the same;

FIG. 3 is a perspective view of the indicator unit;

FIG. 4 is an exploded view of the various parts of the combination instrument; and FIG. 5 is a view taken along the lines 5—5 of FIG. 4 in the direction of the arrows.

As seen in FIG. 1, the combination measuring and controlling unit is particularly useful when inserted in a suitable aperture in the side wall of a bulk milk storage tank shown schematically at 10. The neck portion 11 of a thermometer bulb housing is shown inserted through an opening in tank wall 10 such that the bulb portion 12 of a capillary tube 13 may be immersed in the bulk milk stored within the tank. The capillary tube 13 extends within the main portion of the instrument housing where it communicatively connects with one end of a bellows 14. A filling tube 15 is provided for admission of suitable fluid or other condition responsive means into the bellows 14 and the capillary tube 13 to substantially fill the areas in communication with the sensing element 12 of the capillary tube. The bellows 14 is suitably attached or secured to the rearward side of a mounting or dividing plate 16. The other end of the bellows carries a plunger 17 or the like, which is adapted to contact one arm 18 of a bell crank assembly 20 suitably mounted on a pivot 21. The one arm 18 of the bell crank transmits motion from the plunger 17 to the pointer element 22 of the indicator unit generally shown at 23 in FIGS. 3 and 4. The one arm 18 of the bell crank has an upwardly directed extension 24 passing through aperture 25 in the divider plate 16. Member 26 of the indicator unit 23 is rigidly connected to the extremity of extension 24 and transmits motion to the sector gear 27 through suitable linkage. Such serves to drive pinion 28 to rotate pointer 22 about its axis or shaft forward of the dial 29 and thus to indicate the temperature measurement of the condition or bulk milk being measured. Spring 30 is provided interconnecting a fixed point on the indicator unit with extension 24 on the one arm 18 of the bell crank so as to urge the latter toward the plunger 17 of the bellows.

The second arm 19 of the bell crank carries switch actuator 31 which may be adjustable thereon and which overlies and is adapted to contact lever 32 to actuate the plunger 33 of the snap action switch 34 (FIG. 2). Preferably the switch or control means 34 has leads 35 connected to connector 36 which may be mounted upon the instrument housing. Connector 36 is adapted to be electrically connected to a compressor of a refrigerating unit. The refrigerating unit may be located remotely of the gauge unit for the purpose of cooling the contents of the chamber to a desired temperature range, such being controlled by switch means 34. The switch 34 is preferably pivotally mounted at 37 to the rear side of the divider plate 16. One end of switch mounting plate 39 adjacent the pivot 37 is engaged by a free end of spring 38. The central portion of the spring 38 has several turns through which the pivot member 37 extends. The other end of the spring 38 is adapted for fitting into one of several holes provided in the rear surface of the divider plate 16 so as to bias the switch mounting plate 39 in a counterclockwise direction (FIG. 4). The free end of the switch mounting plate 39 has slot 40 to receive an eccentric cam 41. Cam 41 has a slotted extension 42 passing through a suitable aperture in the dividing plate 16 and dial 29 such that adjustment of the switch means about its pivot with respect to switch actuator 31 may be accomplished by rotating slotted extension 42 from dial plate 29.

Each of the arms 18, 19 of the bell crank are pivotally mounted at 21 and may be adjusted to various fixed positions relative to one another. Preferably a bracket extension 43 is rigidly fixed to arm 18, the bracket being suitably apertured to receive an adjustable means interconnecting the bracket 43 and one end of the arm 19 remote from the switch actuating means. The bracket may have a threaded extension 44 rigidly secured thereto that is adapted to receive threaded portions of the adjusting element 45. The adjustable member 45 terminates in a reduced portion 46 which passes through an aperture in the remote end of arm 19. The reduced portion 46 presents a flanged surface for abutment against one side of the arm 19 and is provided at its outer end with a stop member 47. A spring 48 is positioned about the reduced portion 46 between stop member 47 and the adjacent side of the arm 19, such that the spring 48 will urge the two arms, as permitted by the adjustment member 45, in opposed directions about their common pivot 21. Thus, by adjustment of screw 45, the relative fixed positions of arms 18 and 19 of the bell crank may be varied and consequently the distance of travel of the switch actuator 31 to the lever 32 may be varied to alter the predetermined time period of elapse before the switch actuator will throw the switch button 33 to de-energize the normally closed switch 34.

The interior of the control head or main portion of the instrument housing is preferably provided with a fixed temperature control which compensates for deviations in the ambient temperature. This may be accomplished by providing in the circuit of the switch 34 a 10,000 ohm, 10 watt resistor 50 controlled by a small bimetallic thermostat 51 which preferably is set at approximately 90° F. Other types and values of heating units can be used.

With the instrument in position, normally closed switch 34 will energize an electrical circuit to operate a refrigerating unit for cooling the bulk milk. Cooling of the milk will ultimately cause the fluid in the capillary tube 13 and bellows 14 to contract and plunger 17 will be urged away from the arm 18. However, spring 30 will cause arm 18 to follow the plunger 17 so as to rotate the bell crank in a clockwise direction (FIGS. 2 and 4) about its pivot 21. Clockwise motion of arm 18 will move member 26 to the right to cause clockwise rotation of sector gear 27 and counter-clockwise rotation of pinion 28 and the pointer 22 so as to show the decrease or change in temperature. Clockwise motion of arm 18 will also compress spring 48 between stop member 47 and arm 19. Continued clockwise motion of arm 18 will transmit clockwise motion to arm 19 which in turn will cause switch actuator 31 to depress the plunger or button 33 on the switch 34 to open the circuit, so as to render the refrigerating unit inoperative. As the temperature of the bulk milk increases, the condition responsive means will cause a reversal of operation of the mechanism with arm 18 moving in a counter-clockwise direction to cause clockwise pointer movement and, upon release of the compression in spring 48, to cause arm 19 and the switch actuator to move away from the switch button 33 which will then snap up into its normal closed-circuit position and thus reinstate the cooling operation. Spring 48 thus serves to protest switch 34 from excessive damage, while permitting pointer 22 to continue normal movement. The various adjustments 31, 45, and 42 of the switch relative to its actuator permits an adjustment of the temperature condition of the stored milk at which the cooling unit will be energized and de-energized.

It should be apparent that modifications may be made in the construction and arrangement without departing from the spirit of the invention except as defined in the appended claims.

What is claimed is:

1. The combination comprising condition responsive means, means actuated by said condition responsive means for transmitting motion including two arms positioned on a common pivotal support in a predetermined relation to each other, the line of action of said condition responsive means intersecting one of said arms, indicating means connected to said motion transmitting means and actuated by said one arm, and switch means actuated by the second of said arms of said motion transmitting means for controlling the restoration of a desired condition, whereby said indicating means and said switch means are operated by a common means.

2. The combination comprising condition responsive means, means actuated by said condition responsive means for transmitting motion including two arms positioned on a common pivotal support in a predetermined angular relation with each other, the line of action of said condition responsive means intersecting one of said arms, indicating means connected to said motion transmitting means and actuated by said one arm, and switch means for controlling the restoration of a desired condition, the other arm having switch actuating means rigidly connected thereto and overlying said switch means for actuation thereof, whereby said indicating means and said switch means are operated by a common means.

3. The combination comprising condition responsive means, means actuated by said condition responsive means for transmitting motion including two arms positioned on a common pivotal support in a predetermined relation to each other and means for positioning one of said arms relative to the other, the line of action of said condition responsive means intersecting one of said arms, indicating means connected to said motion transmitting means and actuated by said one arm, and switch means actuated by the second of said arms of said motion transmitting means for controlling the restoration of a desired condition, whereby said indicating means and said switch means are operated by a common means.

4. The combination comprising condition responsive means, means actuated by said condition responsive means for transmitting motion including two arms positioned on a common pivotal support in a predetermined angular relation with each other and means for angularly positioning one of said arms relative to the other, the line of action of said condition responsive means intersecting one of said arms, indicating means connected to said motion transmitting means and actuated by said one arm, and switch means for controlling the restoration of a desired condition, the other arm having switch actuating means rigidly connected thereto and overlying said switch means, for actuation thereof, whereby said indicating means and said switch means are operated by a common means.

5. The combination comprising condition responsive means, motion transmitting means including a bell crank actuated by said condition responsive means, the line of action of said condition responsive means intersecting one arm of said bell crank, indicating means connected to said motion transmitting means and actuated by said one arm, pivotally mounted switch means actuated by the second of said arms of said motion transmitting means for controlling the restoration of a desired condition, and means for adjustably positioning said switch means about its pivotal axis, whereby said indicating means and said switch means are operated by a common means.

6. A temperature indicator and controller unit for bulk milk tanks and the like, comprising a thermometer bulb having one end adapted to be inserted in a liquid container and another end leading to a housing, fluid responsive means within said housing and communicating with said bulb, motion transmitting means including a bell crank actuated by said fluid responsive means, the line of action of said fluid responsive means intersecting one arm of said bell crank, indicating means connected to said motion transmitting means and actuated by said one arm, and switch means actuated by the second of said arms of said motion transmitting means for controlling a circuit normally energized for cooling the liquid in said container, whereby periodic removal of said bulb from said container will facilitate easy cleaning thereof for repeated use.

References Cited by the Examiner

UNITED STATES PATENTS

| 1,592,892 | 7/26 | McCuen. | |
| 1,960,856 | 5/34 | Stacey | 73—368.7 X |
| 2,698,025 | 12/54 | Jordan | 73—317 X |
| 2,741,099 | 4/56 | Beane | 73—343 |

ISAAC LISANN, *Primary Examiner.*